United States Patent [19]

Sturges, Jr. et al.

[11] Patent Number: 5,396,714
[45] Date of Patent: Mar. 14, 1995

[54] APPARATUS FOR ASSEMBLY OF AXISYMMETRIC AND NON-AXISYMMETRIC RIGID PARTS

[75] Inventors: Robert H. Sturges, Jr., Mt. Lebanon; Schitt Laowattana, Pittsburgh, both of Pa.

[73] Assignee: Carnegie Mellon University, Pittsburgh, Pa.

[21] Appl. No.: 168,039

[22] Filed: Dec. 15, 1993

[51] Int. Cl.$^6$ .................................... G01B 5/25
[52] U.S. Cl. ........................... 33/644; 33/520; 901/45
[58] Field of Search ............ 33/1 N, 519, 520, 533, 33/534, 644, 645; 901/45

[56] References Cited

U.S. PATENT DOCUMENTS

| | | | |
|---|---|---|---|
| 2,968,872 | 1/1961 | Welles | 33/645 |
| 4,098,001 | 7/1978 | Watson | 901/45 |
| 4,367,591 | 1/1983 | Hirabayashi et al. | 33/644 |
| 4,400,885 | 8/1983 | Consales | 33/520 |
| 4,477,975 | 10/1984 | De Fazio et al. | 33/644 |
| 4,627,169 | 12/1986 | Zafred et al. | 33/644 |
| 4,848,757 | 7/1989 | De Fazio | 33/644 |
| 4,991,306 | 2/1991 | Raiha | 33/644 |
| 5,148,610 | 9/1992 | Cusack | 33/520 |
| 5,219,379 | 6/1993 | Good et al. | 33/645 |
| 5,222,306 | 6/1993 | Neumann | 33/645 |
| 5,312,212 | 5/1994 | Naumec | 901/45 |

*Primary Examiner*—William A. Cuchlinski, Jr.
*Assistant Examiner*—G. Bradley Bennett
*Attorney, Agent, or Firm*—Reed Smith Shaw & McClay

[57] ABSTRACT

An azimuth angle compensation device adapted for use with an assembler device for inserting an object into a workpiece, whereby the assembler device establishes a centerline corresponding substantially to an insertion axis of the object to be inserted into the workpiece. The azimuth compensation device includes:

(1) a first member;

(2) a second member; and (3) structure connecting the first and second members for causing the second member and the object to rotate about the centerline through at least one angle and in at least one direction when the object is brought into contact with the workpiece by the assembler device.

53 Claims, 9 Drawing Sheets

APPARATUS FOR ASSEMBLY OF AXISYMMETRIC AND NON-AXISYMMETRIC RIGID PARTS

FIELD OF THE INVENTION

The present invention relates in general to assembly apparatus and, more particularly, to apparatus for mechanized insertion of axisymmetric and non-axisymmetric rigid parts into workpieces such as subassemblies and products.

BACKGROUND OF THE INVENTION

Heretofore, assembly tasks involving insertion of rigid parts into subassemblies and products by machine or robot has been hindered by the physics of the contacting parts and uncertainties in the positions of the mating parts. For example, if the directions of the forces applied to mate the parts is inappropriate the parts will "jam" and will not move until the direction is corrected. If the initial positions of the parts are incorrect due to inaccuracy of the assembly machine or the dimensions of the parts themselves, the parts will wedge together and will not move unless the parts are separated and the assembly step is repeated. (The common experience of a stuck bureau drawer is a common example of wedging.) A wide class of assembly tasks is described by this simple "peg in hole" geometry and its variants.

Present methods employed to guarantee mechanized assembly include loose part tolerances, additions of generous chamfers, vibration of the pieces to improve the probability of the parts mating, active control of part positions or speeds by sophisticated force sensors and actuators, and the use of passive compliances.

Passive compliance apparatus, in particular, have enjoyed practical success because of the economies they realize in terms of assembly equipment hardware complexity and cost. Moreover, because of their manner of operation they reduce the need for incorporating part-mating facilitation features (e.g., generous tolerance and chamfer) into the object and the workplace in which the object is to be inserted, which features might promote ease of assembly at the expense of appearance, functionality or performance. For instance, the remote center of compliance (RCC) device disclosed in U.S. Pat. No. 4,098,001 is effective in assembling axisymmetric parts with chamfers and tolerances which range from very slight clearance to negative (i.e., interference) fits. RCC devices function by responding to part mating forces which arise during assembly with compensating motions that adjust the parts into better alignment. The essential mechanism is a set of linkages and/or springs which comply about a point in space nearly coincident with the tip of the part to be inserted or the rim of the hole that receives the part. In other mechanisms, the effect of compliance is relatively far from the initial part-to-product contact point. In this case, forces and moments due to contact usually make the parts move away from the ideal insertion centerline. An adjustable RCC proposed in U.S. Pat. No. 4,477,975 improves the RCC device of U.S. Pat. No. 4,098,001 by allowing adjustment of the position of the compliance center with respect to the part along or a short lateral distance off this centerline.

A disadvantage of presently available RCCs is that their arrangement of links and/or springs responds primarily to forces and torques exerted in imaginary planes within which lies the common central axis or centerline of the RCC. That is, they respond to insertion induced mating forces that are coplanar with the RCC centerline which can be best appreciated from a side, or an "elevation" view of the apparatus, but not to torsional, or twisting forces about the apparatus centerline, which are best conceptualized in a "plan" view of the device. In other words, from a plan view perspective, a typical RCC responds to forces arising at the part chamfer by resisting twisting motion which would be needed for correct insertion. Moreover, their response to forces and torques exerted in planes containing the RCC centerline is to produce compensating motions exclusively in those same planes. To illustrate this point, the RCC of U.S. Pat. No. 4,098,001 explicitly requires torque preventing means for preventing twisting about the RCC centerline of the operator member or part to be inserted into a workplace. Such an RCC is thus adequate for peg and hole geometries which are axisymmetric (circular), and for parts which are not circular in cross section (non-axisymmetric) but have no positioning error about their insertion axes (which are typically virtually coincidental with the RCC centerline). Since it remains highly difficult, if not impossible, to eliminate insertion axis positioning errors in respect to non-axisymmetric parts, known RCCs often fail to properly insert such parts into mating holes, e.g., square pegs into square holes.

An advantage exists, therefore, for an apparatus which is capable of inserting both axisymmetric and non-axisymmetric parts into correspondingly shaped holes under circumstances where positioning errors exist with respect to the insertion axes of such parts.

SUMMARY OF THE INVENTION

The present invention provides a solution to the non-axisymmetric part insertion problem via a passive azimuth angle compensation device which responds to those components of the insertion-induced mating forces directed along or substantially parallel to the insertion axis with compensating lateral motions or forces exerted at right angles to these mating force components. These lateral motions or forces in turn give rise to compensating torques or rotations about the insertion axis. From the perspective of motions only, an operator member such as a peg supported by the subject invention will respond with a twist about its insertion axis when brought in contact with the object into which it is to be inserted and when moved up or down relative thereto. That is, the peg motion will describe a screw-like or helical motion, either left- or right-handed. From the viewpoint of forces only, the peg will respond with a torque when contacting and when moved up or down in relation to the target object. Hence, the peg will respond like a gyroscope, rotating clockwise or counterclockwise. The preferred ranges of helical motion pitch and ratios for gyroscopic relation will be discussed later herein.

Structural characteristics common to all embodiments of the present invention include a first member adapted for connection to an assembler device which normally includes a conventional RCC, a second member connected to operator means which may include an object to be inserted into a mating hole provided in a workpiece to be assembled, and means connecting the first and second members. The connecting means are constructed and arranged to exert torque for causing the second member and thus the operator means to rotate relative to the first member about the assembler device centerline (or part insertion axis) through at least one angle and in at least one direction when the operator means is brought into contact with the workpiece to be assembled. Various preferred constructions of the apparatus of the instant invention which incorporate these components are described in greater detail hereinafter.

A significant feature of the instant invention is that the direction of compensating twist or torque about the insertion axis is predetermined. With no active elements, the initial sense of rotation (clockwise or counterclockwise) depends on the initial configuration of the device employed rather than the state of contact of the mating parts. To ensure that the initial compensating motion has the correct sense to reduce the initial angular error about the insertion axis, the part should be deliberately displaced at a small angle away from its desired assembled orientation. This angular displacement should ideally be equal to the size of the largest anticipated angular error. In other words, if it is known that the maximum error in peg alignment due to the sum of part dimension inaccuracies and assembly machine accuracies would be, for example, ±1°, then an initial azimuthal displacement of 1° should be set between the part and its mate in the opposite sense from the motion of the compensating device. Thus, on the basis of chance, the actual compensating motion will always be positive or zero. If the initial displacement is larger than this, extra unneeded motion results. If the initial displacement is smaller, the compensating motions may have the wrong sense, whereupon the assembly process may fail but may be easily reexecuted. Further, an embodiment of the invention which avoids the need to initially displace the parts is also provided.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Figure 1:
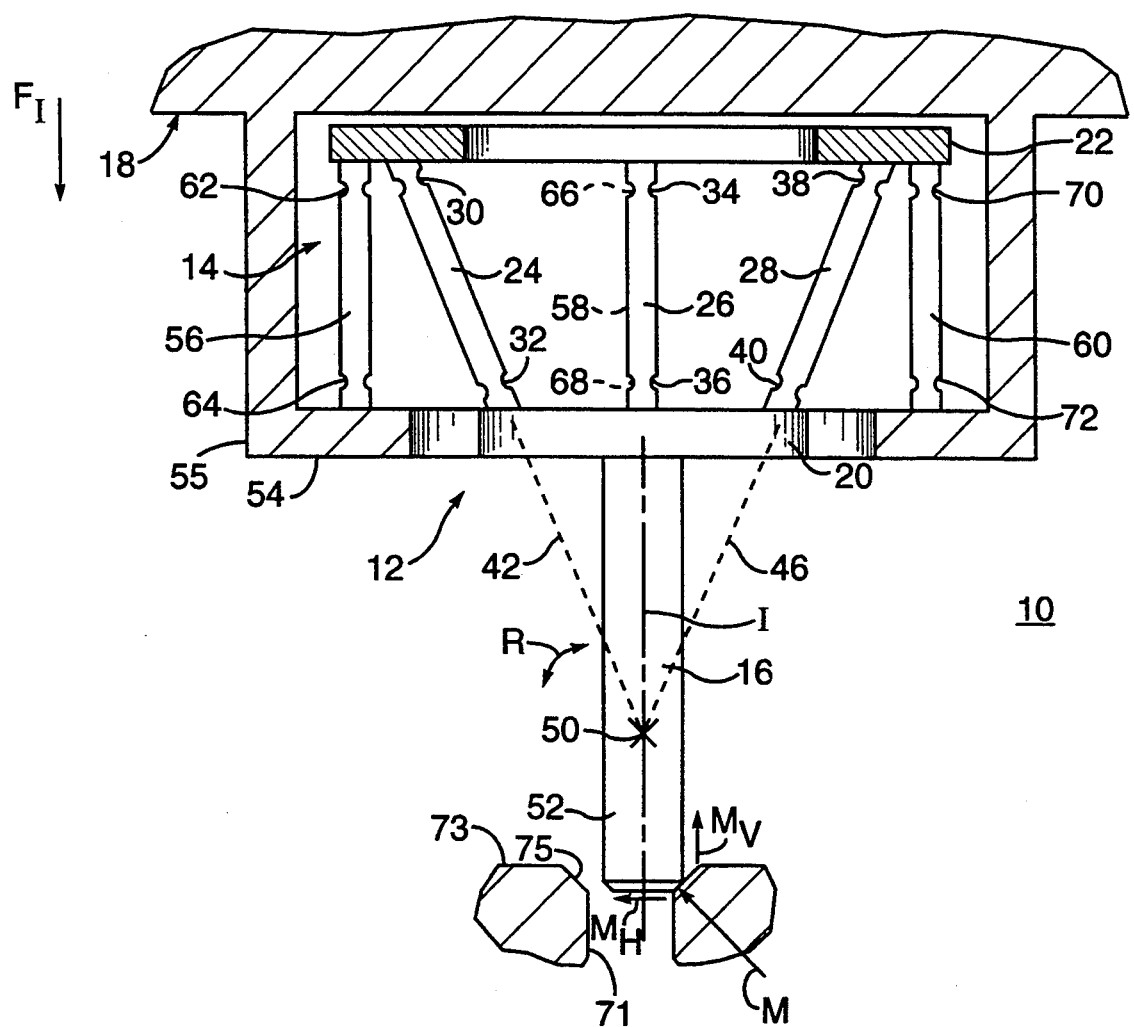
FIG. 1 is schematic cross-sectional diagram, in elevation, of a conventional remote center of compliance (RCC) device adapted for inserting axisymmetric parts into workpieces.

FIG. 1 represents a typical construction of a remote center of compliance (RCC) system known to those skilled in the art. Indeed, the RCC system of FIG. 1 is typical of the devices advanced in U.S. Pat. No. 4,098,001. As is the case with known RCC devices, the system 10 shown in FIG. 1 establishes a center of compliance that is a point in space about which rotational motion and with respect to which translational motion may take place. The remote center may be within the RCC itself or its operator member, or parts carried by the operator member, or external to it.

The remote center compliance system 10 includes means for establishing rotational motion 12 and means for establishing translational motion 14. An operator member 16 is extended outwardly from the means for establishing rotational motion 12, and the means for establishing rotational motion 12 and translational motion 14 are concatenated and extended from a portion 18 of the assembler machine or device to which system 10 is attached. It will be understood that operator member 16 may be the actual part to be inserted into a workpiece. Alternatively, operator member 16 may be a robot hand, mechanical grip, claws, clamps or the like which manipulate the part to be inserted or otherwise directed by the mechanism. The means for establishing rotational motion includes a member, plate 20, and another member, ring 22, which are relatively, rotatably interconnected by means such as flexures 24, 26, and 28.

Flexures 24, 26, and 28 have major motion portions, pairs of reduced portions 30, 32; 34, 36; 38, 40, respectively, conveniently located proximate associated plates 20 and 22 in order to concentrate the motion at those reduced portions. Flexures 24, 26 and 28 lie along portions of radii 42, 44 (not shown) and 46, which emanate from center 50 which is remote from the system: it exists at, near, or beyond the free end 52 of the operator member 16 (or the part supported thereby).

The means for establishing translational motion 14 includes a member such as lip 54 integral with cylindrical wall 55 of machine 18, and another member which can be constituted by plate 22, which thus forms a part of both the translational and rotational mechanisms. Means for establishing translational motion 14 also includes, between plate 22 and lip 54, flexures 56, 58 (blocked from view in FIG. 1 by flexure 26), and flexure 60, each of which has reduced portions 62, 64; 66, 68; 70, 72, respectively, similar to those associated with flexures 24, 26, and 28. A translational force, as will be described below, exerted on the end 52 of operator member 16 causes relative translational motion between plates 20 and 22 by means of flexures 56, 58, and 60, while a torque exerted about the end 52 causes relative rotational motion between plates 20 and 22 about remote center 50 by means of flexures 24, 26 and 28.

In operation, the system is moved axially with machine part 18 along an insertion axis I which corresponds essentially to the centerline of operator member 16 and the assembler device centerline extending through the centers of associated plates 20 and 22. Such motion moves the operator member toward and then into hole 71 in workpiece 73. Fine adjustment of the position of the operator member in an imaginary plane which contains the insertion axis I occurs via the means for establishing rotational motion 12 and the means for establishing translational motion 14 in response to a resultant interference or mating force M exerted by a chamfer 75 against the operator member end 52 while the operator member experiences an insertion force $F_I$. For illustrative purposes, the contact force M is shown resolved into its component forces, at the point of contact, herein referenced by $M_v$ for the vertical component of contact force and $M_H$ for the horizontal component of such force. $M_H$ determines the extent of translational compensating motion of the operator member 16 to occur through operation of the means for establishing rotational motion 12. Whereas, the sum of the moments created by the combination of $M_H$ and $M_v$ multiplied by their respective distances from center 50 determines the direction of relative rotation R of plates 20 and 22 (and thus operator member 16) about center 50 afforded by the means for establishing rotational motion 12. As stated at the outset, RCCs of the type just described are effective for inserting axisymmetric (round) objects into other objects having holes of similar dimension and shape. Such apparatus, however, are not reliably capable of inserting non-axisymmetric, e.g., polygonal, elliptical, or splined, objects into mating holes when azimuth angle positioning errors exist between the object and the hole in which it is to be inserted. A schematic representation of the difficulties which arise under these circumstances will be more fully appreciated by reference to FIG. 2 discussed below.

Figure 2:
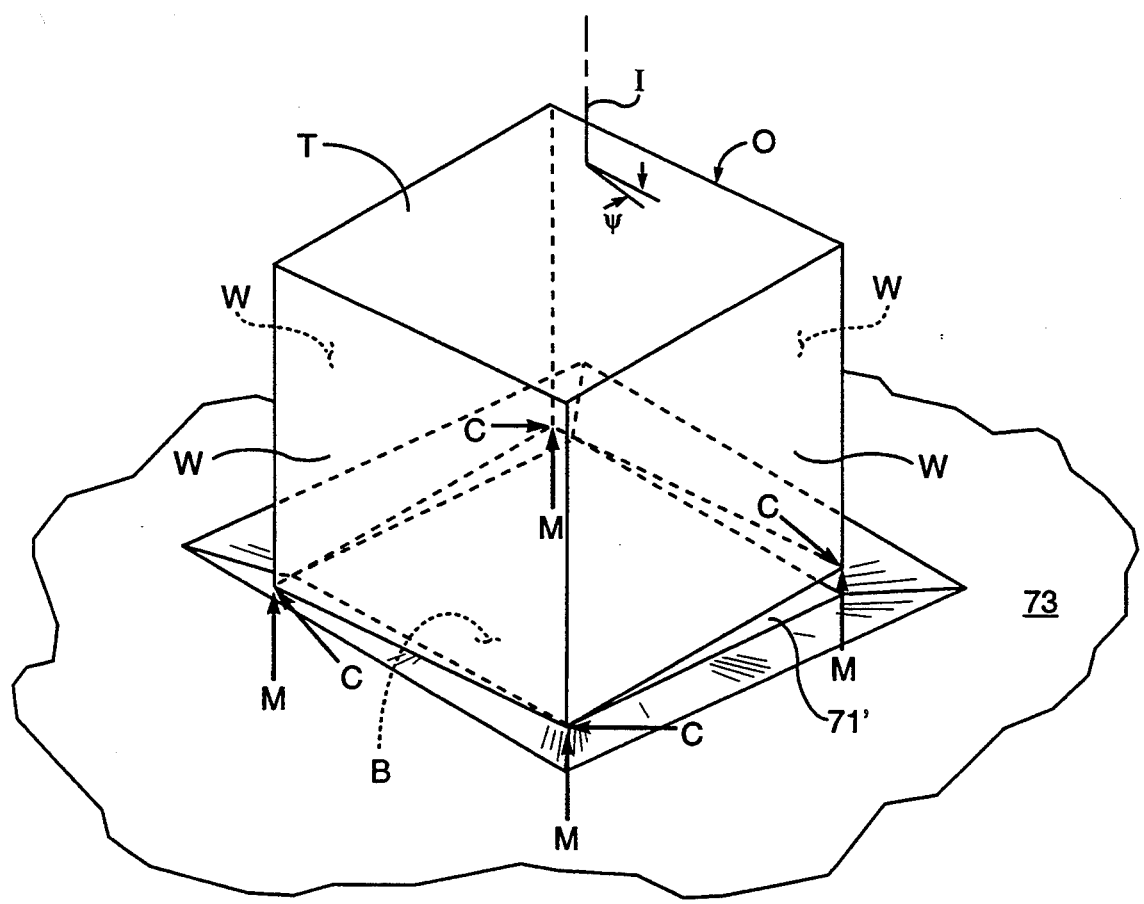
FIG. 2 is a perspective schematic view of certain components of the mating forces which arise when a non-axisymmetric part is improperly aligned with respect to a workpiece into which it is to be inserted, as well as the compensating forces which are produced by the apparatus of the present invention upon the occurrence of such a misalignment condition.

FIG. 2 depicts a non-axisymmetric object O in the form of a generally cubic prism having a base surface B, a top surface T and four walls W adapted to be matingly received in a hole 71' provided in workpiece 73'. The rim of hole 71' is surrounded by a chamfer 75' to facilitate insertion of the object O into hole 71'. As shown, object O is azimuthally misaligned about its centerline or insertion axis I by a certain azimuth angle $\psi$ with respect to hole 71'. Consequently, upon attempted insertion of the object O into hole 71', the corners of the base surface B contact the chamfer 75' resulting in interference or mating forces M (only the vertical components of which are shown) being exerted by the chamfer 75' against the object O at these locations. If supported by a conventional RCC, the non-axisymmetric object O could remain in this state of interference in relation to the chamfer 75' should the RCC attempt to compensate with translation and/or rotation about its remote center of compliance (not illustrated) in any imaginary plane containing the insertion axis I. For example, if the chamfer 75' were steep, the friction were small and the torsional resistance of the RCC were relatively weak, the horizontal components of the contacting or mating forces may urge the workpiece 73' to alignment. However, if the chamfer is shallow, the friction high, (e.g., unlubricated plastic parts) and the torsional resistance high or, alternatively, if $\psi$ is great enough with respect to the chamfer that the workpiece contacts the upper surface of 73, then insertion will fail.

If, however, compensating forces of appropriate magnitude, herein designated by reference character C, were to be introduced about the insertion axis at right angles thereto, then the azimuth angle misalignment would be effectively corrected. In such instance, any remaining positioning errors may be overcome by the inherent rotational and/or translational compensation exerted by the RCC in an appropriate imaginary plane containing the insertion axis I whereupon object O may be properly inserted into hole 71'. The present invention overcomes the non-axisymmetric object insertion problem graphically represented in FIG. 2 by proposing azimuth angle compensation devices of uncomplicated design and operation, which may be used in combination with conventional RCCs. That is, the instant invention proposes several exemplary, although not limitative, embodiments of a simply constructed and compact device for exerting compensating forces about the insertion axis (and at right angles to imaginary planes containing such axis) of a non-axisymmetric object which is azimuthally misaligned with respect the workpiece into which it is to be inserted.

Figure 3A:
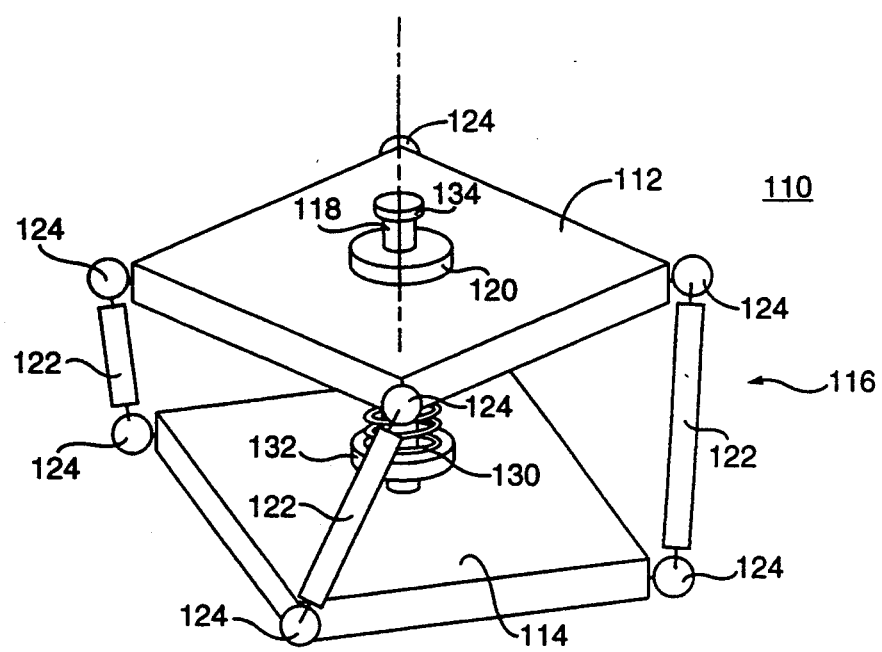
FIG. 3A is a perspective view of a first preferred embodiment of an azimuth angle compensation apparatus constructed according to the present invention.
Figure 3B:
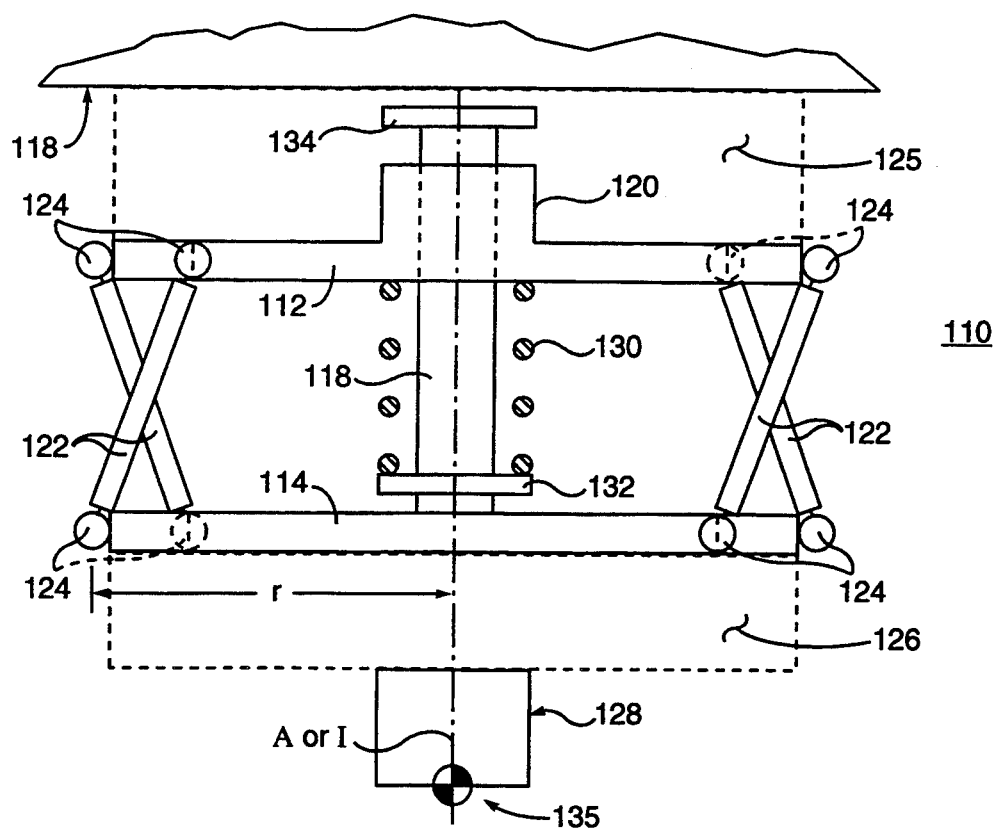
FIG. 3B is a schematic side elevation view of the apparatus of FIG. 3A shown in conjunction with an assembler device.

In this connection, FIGS. 3A and 3B illustrate a first preferred embodiment of an azimuth angle compensation device, designated herein by reference numeral 110, constructed according to the present invention. As will be more fully appreciated from the following, the azimuth compensation device 110 may be referred to as a variable pitch azimuth compensator.

The passive azimuth angle compensation device of FIGS. 3A and 3B is, as are all embodiments of the invention, a purely mechanical apparatus. Further, each embodiment disclosed herein commonly possesses the following features, in combination:

(1) a first member adapted for connection to an assembler device;

(2) a second member adapted for connection to operator means normally through a conventional remote center of compliance (RCC) device, which operator means may include an object to be inserted into a mating hole provided in a workpiece to be assembled, whereby the assembler device establishes a centerline corresponding substantially to the insertion axis of the operator means; and (3) means connecting the first and second members for causing the second member and thus the operator means to rotate about the centerline and relative to the first member through at least one angle and in at least one direction when the operator means is brought into contact with the workpiece to be assembled.

In the device 110 shown in FIGS. 3A and 3B, a first member 112 and a second member 114 are operatively related to one another by connection means to be described in greater detail herebelow and generally identified by reference numeral 116. In accordance with this particular embodiment, the first and second members 112 and 114 are formed as polygonal (e.g., square) plates which, for convenience of description, may also be referred to herein as upper plate 112 and lower plate 114. Connection means 116 comprises, in part, a central shaft 118. Upper and lower plates 112 and 114 are desirably coaxial with the shaft 118. The lower plate 114 is fixed to shaft 118 with the upper plate being rotatable thereabout. Preferably, plates 112 and 114 are at all times maintained in parallel relation by somewhat elongated bearing means 120. Bearing means 120 closely surrounds shaft 118 and may be an elongated bushing or collar member either formed integrally with or as a separate member affixed to upper plate 112.

Connection means 116 additionally preferably include guidance means which, according to the construction shown in FIGS. 3A and 3B, comprises a plurality of link members 122 inclined at identical angles and having first ends thereof attached to the upper plate 112 and second ends attached to corresponding sites at the lower plate 114. The link members 122 are of equal length and are desirably attached to the plates 112 and 114 through substantially universal joint means 124 such as spherical bearings, ball-and-socket joints or other suitable means which permit the link members to rotate freely in any direction. The corresponding link member attachment sites on plates 112, 114 are at the same radius r from the central axis A of the central shaft 118 and plates 112, 114 (FIG. 3B). Although shown in a presently preferred construction wherein they are attached by joint means 124 to the corners of the upper and lower plates 112 and 114, it will be understood that the link members 122 may be connected to any corresponding opposed attachment sites on plates 112,114 so long as those sites are spaced at equal radii from the central axis of shaft 118. By virtue of the link members 122 and joint means 124 assembly, motion of the lower plate 114 with respect to the upper plate 112 is constrained to execute a variable pitch helical motion. Moreover, while only one such linkage is necessary to impart this constraint, several are typically used in practice in the manner described above to share and distribute the loads evenly about the central axis A of the shaft 118.

According to a presently preferred arrangement, the first member or upper plate 112 is adapted to be attached by any suitable fastening means to a fixed portion 118 of an assembler machine. An annular spacer means 125 is desirably provided between the upper plate and the assembler machine to accommodate axial movement of the shaft 118 during operation. As will be elaborated upon hereinafter, a conventional RCC device 126 (shown in phantom in FIG. 3B) is preferably interposed between the azimuth angle compensation device 110 and an operator member 128 described below. Alternatively, the RCC device 126 may be interposed between the azimuth compensation device 110 and the assembler machine. Hence, the scope of meaning to be ascribed to the term "assembler device" shall be understood to include both the assembler machine and the assembler machine in combination with an RCC such as RCC 126.

The second member or lower plate 114 is connected to the RCC device 126 which, in turn, carries an operator member 128. Like the operator member 16 discussed hereinabove in respect to the RCC 10 shown in FIG. 1, operator member 128 may be the actual object to be inserted into a mating hole provided in a workpiece to be assembled or it may also assume the form of a robot hand, mechanical grip, claws, clamps or the like which manipulate the object to be inserted. In either case, the present discussion will, for convenience of description, refer generically to component 128 simply as the "operator member."

The connection means 116 additionally includes biasing means 130. Biasing means 130 may be a compression spring, torsion spring or other means which imparts force against at least one of the upper and lower plates 112, 114 to maintain spacing therebetween. In a presently preferred construction, biasing means 130 comprises a compression spring concentrically disposed about the central shaft 118. A first end of spring 130 abuts a lower surface of the first member 112 and either the upper surface of the second member 114 or, as is shown in FIG. 3B, a first stop member 132 affixed to central shaft 118. The axial force produced by spring 130 balances forces which arise along the operator member insertion axis I during a workpiece assembly operation. Moreover, it is this reaction force which compels the link members 122, through the joint means 124, to exert forces about the insertion axis I in directions perpendicular to imaginary planes containing the insertion axis. Hence, the second member 114 and the RCC device 126 rotate about the central axis A of shaft 118 while the operator member 128 rotates about its insertion axis I (which is preferably colinear with the central axis A of shaft 118 and the centerline of the assembler device) when the tip of the operator member is brought into contact with the workpiece within which it is to be inserted. The ideal value of the biasing force is a function of the dynamics of the assembler device and must be sufficient to prevent vibration of the components of the azimuth angle compensation device 110 during operation. Desirably, the tangential force of the biasing means should be as small as possible to eliminate counteracting torques. In this regard it is preferred that the biasing means 130 be a compression spring and that the first stop member 132 comprise an anti-friction thrust bearing or the like. Further, to prevent excessive axial separation between the upper and lower plates, the device 110 also desirably possesses a second stop member 134 affixed to an upper end of the central shaft 118.

The rotational motion of the second member 114 about the central axis A of shaft 118 is substantially parallel to the plane of the tip or distal end of the operator member 128. For descriptive purposes, the terms "azimuth angle motion" or, simply, "azimuth angle" are used herein to identify this motion. And, the associated linear motion of the second member 114 along the shaft 118 is at times referred to as "axial motion."

Additionally, since the device of the present invention compensates only for angular object positioning errors in respect to azimuth, i.e., about the insertion axis I, it will frequently be employed in conjunction with a conventional or adjustable center RCC such as RCC 126 when azimuthal positioning errors are anticipated in mechanized assembly tasks. In this connection, FIG. 3B shows a remote center of compliance 135 established by the RCC 126. As is known, the remote center of compliance 135 may be situated at the tip of the operator member 128 (as shown) or at virtually any other location generally along the insertion axis I.

Figure 3C:
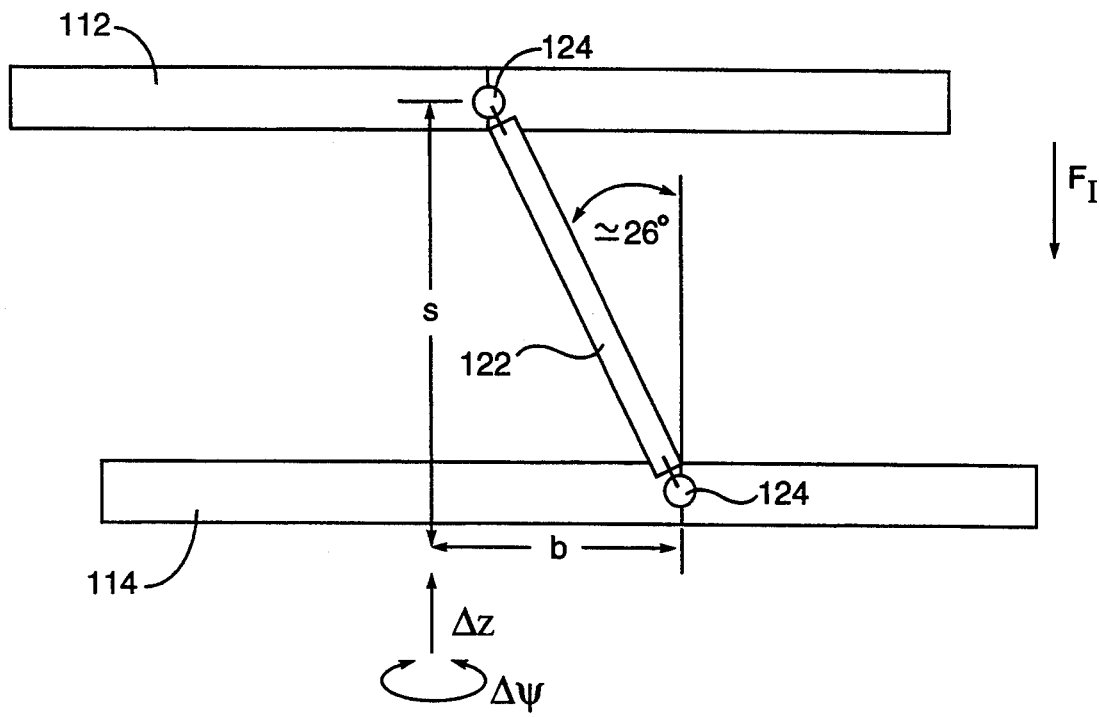
FIG. 3C is an enlarged view of an initial configuration of a linkage means of the azimuth angle compensation apparatus of FIG. 3A.
Figure 3D:
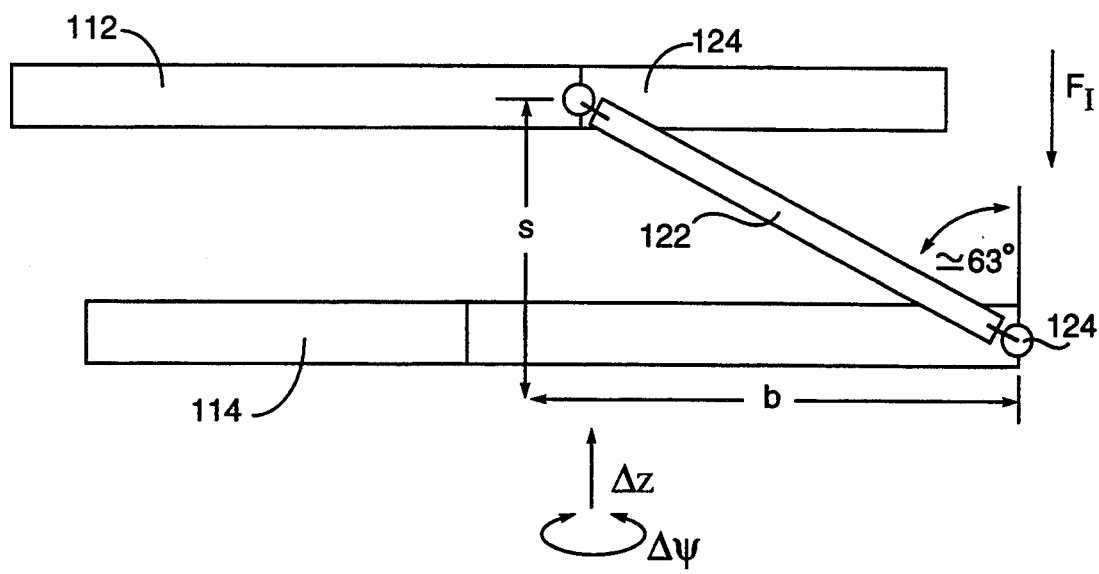
FIG. 3D is an enlarged view of another initial configuration of a linkage means of the azimuth angle compensation apparatus of FIG. 3A.

The aforementioned variable pitch helical motion executed by the lower plate 114 in relation to the upper plate 112 is determined by the initial configurations or orientations of the plates relative to one another. A first example of such an initial configuration is depicted in FIG. 3C. More particularly, a starting configuration is shown where a single link member 122 (the others being omitted for clarity of illustration) is inclined about 26° from the vertical direction. It will be understood that the other link members have the same inclination. A small axial motion which brings the plates together by an amount $\Delta z$ in response to an insertion force $F_I$, will cause the lower end of the link member to move to the right by about twice that amount since "s", the vertical distance between the joint means 124, is approximately twice the horizontal distance "b" therebetween. The resulting angular or azimuth motion $\Delta \psi$ of the lower plate 114, in radians, will then be found by dividing this lateral displacement by the radius r (see FIG. 3B). Similarly, FIG. 3D shows a starting configuration in which the link member 22 is inclined at about 63° from the vertical direction. In this situation, a small axial motion which brings the plates together by an amount $\Delta z$ will cause the lower end of the link member 122 to move by about half that amount since b in this situation is about twice the magnitude of s. The resulting azimuth motion $\Delta \psi$ is thus adjustable in approximate proportion to the initial vertical plate separation, s, divided by the horizontal distance, b, between link joint means 124. In other words, the pitch may, therefore, be generally defined as the axial motion divided by the corresponding azimuth motion arising from a given insertion force. Hence, for practical purposes, the starting configuration establishes the pitch since the actual angular (azimuth) motions are small. The pitch is then approximately r times s divided by b. The initial linkage configuration reflected in FIG. 3D, although more limited in the degree of azimuth motion that can be produced when compared with that of FIG. 3C, is capable of withstanding substantially greater insertion forces and thus may find more practical application in heavy industry assembly applications where such forces are more commonly encountered.

Alternatively, variable pitch can be achieved by uniformly varying the lengths of the link members 122, but this is comparatively difficult to do in practice.

Among the virtues of an adjustable pitch compensation device is that the actual insertion force needed to twist the operator member with respect to the workpiece hole varies in direct and easily determinable relation to the contact friction. For a part impinging on a flat surface (i.e., no chamfer), the pitch needs to be at least d times $\mu$ to cause azimuth motion in reaction to sticking friction, where d is distance in the surface plane from the assembler device centerline (typically the insertion axis) to the contact point, and $\mu$ is the friction coefficient. All of these values are readily found by measurement of the parts to be assembled. As to object contact with chamfered workpieces, certain factors related to chamfer slope are introduced; however, under those circumstances, the calculations become more sophisticated.

In the instant following attempted object insertion and prior to the occurrence of azimuth compensation motions, the preload forces of the device depend on the degree of displacement of the biasing means 130. Since the distance between the plates 112, 114 varies with pitch, the effective preload will also necessarily vary unless the biasing means is independently adjusted with a locking collar.

Figure 4A:
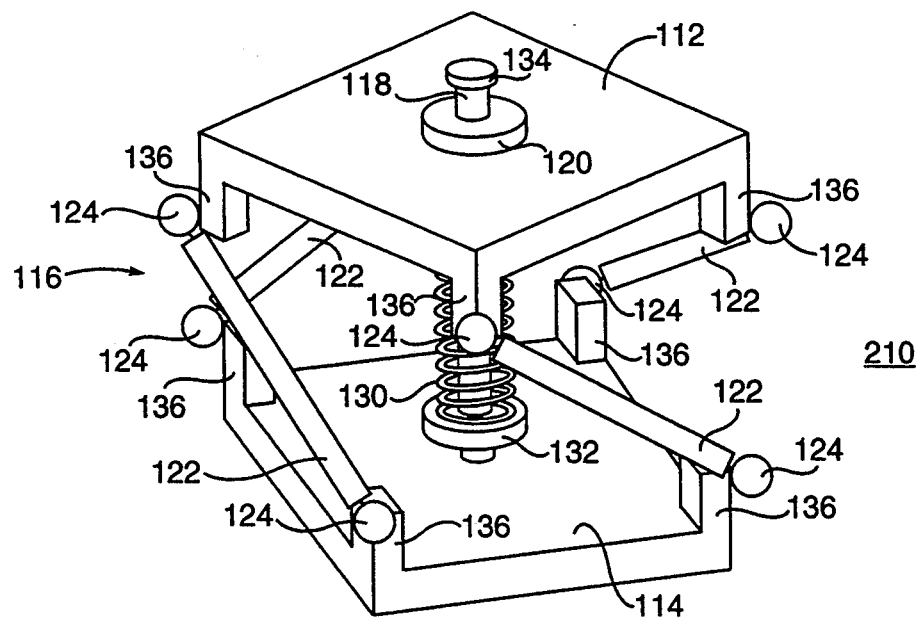
FIG. 4A is a perspective view of a further preferred embodiment of an azimuth angle compensation apparatus constructed according to the present invention.
Figure 4B:
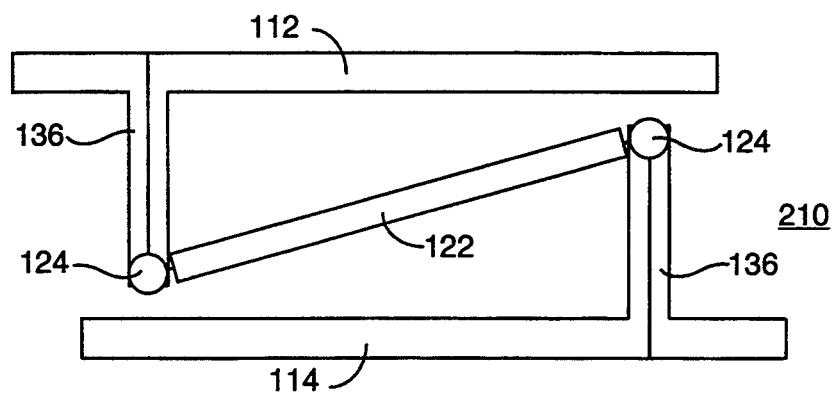
FIG. 4B is a side elevation view of the azimuth angle compensation apparatus of FIG. 4A in an operative configuration (with certain components of the apparatus omitted for clarity of illustration)

Turning to FIGS. 4A and 4B, wherein like references indicate elements similar to those described in connection with FIGS. 3A-3D (as is also true in the remaining views), there is shown a further preferred embodiment of the instant invention which extends the capabilities of the device 110. The azimuth compensation device designated by reference numeral 210 in FIGS. 4A and 4B may be aptly referred to as a variable pitch reversing azimuth compensator. This is because, as will be more fully developed below, device 210 is constructed to provide azimuth compensation in two opposed directions about the insertion axis. For brevity, the essential components of apparatus 210, as well as those of later discussed embodiments of the invention, will not be described in detail except in instances where the materially depart in structure and/or function from the elements identified in FIGS. 3A-3D.

FIGS. 4A and 4B show that the mechanical azimuth compensation device 210 is again preferably comprised of a first member 112 and a second member 114 in the form of polygonal (e.g., square) plates coaxial with a central shaft 118. The lower plate 114 is fixed to the shaft while the shaft is axially translatable and rotatable within the upper plate 112. Collar-like bearing means 120 maintain the plates in substantially parallel relation during operation. As with device 110, the connection means again include guidance means in the form of a plurality of inclined, equal length link members 122, substantially universal joint means 124 and biasing means 130. First and second stop members 132 and 134 are also provided.

According to this particular embodiment, the connection means 116 additionally comprise a plurality of projections or extension fingers 136 to which opposite ends of the link members 122 are attached through joint means 124. Preferably, the projections 136 are situated at or near the corners of the plates with the projections of the lower plate extending toward the upper plate and those of the upper plate extending toward the lower plate. The link members 122 are disposed in parallel relation such that one end of each link member is attached by joint means 124 to a projection 136 corresponding to a corner of the upper plate and the opposite end of the link member is attached by joint means 124 to a projection 136 located at the next succeeding corner of the lower plate. So constructed and arranged, the projections 136 and link members 122 impart an initial direction of rotation to the lower plate at a given pitch when the operator member (not shown) is brought into contact with the workpiece. At the instant when the link members reach a horizontal disposition under influence of the insertion force, the pitch becomes momentarily infinite (i.e., all sliding motion with no resulting rotation). As the plates continue toward each other, the slope of the link members reverses and the sense of rotation of the lower plate 114 relative to the upper plate 112 is reversed.

An advantage of the reversing pitch azimuth compensation device 210 is that the sense of the rotation of the second member 114, and hence the relative initial orientations of the mating object and workpiece, need not be determined ahead of time. As a result, in the event that the initial sense of azimuth motion compensation is incorrect, the plate 114 supporting the operator member or object simply rotates back to its original position and continues from there in the other direction until satisfactory azimuth alignment occurs. During this time, the relative rotation of the operator member and the assembler machine is absorbed by an axial passive compliance. Furthermore, forces may arise between the object and workpiece into which it is to be inserted. Since there is ideally a strict relation between axial motion and azimuth angle, an additional passive compliance is needed in the x and/or y coordinates of the relevant insertion axis plane. It is therefore recommended that a conventional or adjustable center RCC, such as RCC 126 (FIG. 3B), be used in conjunction with this embodiment for these purposes.

Figure 4C:
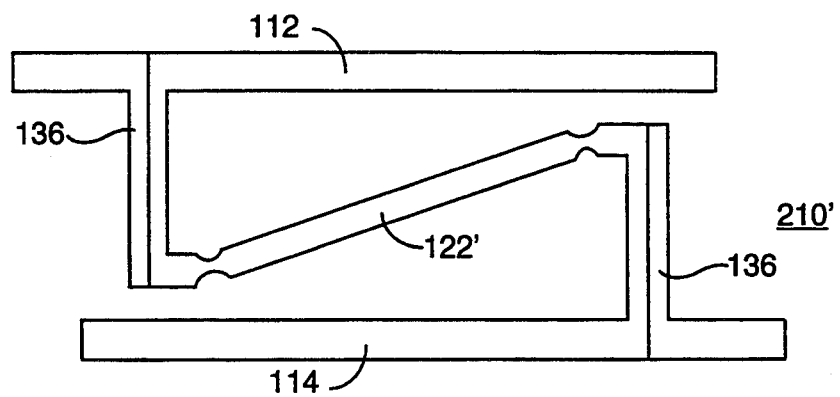
FIG. 4C is a view similar to FIG. 4B of an alternative embodiment of the azimuth angle compensation apparatus of FIG. 4A.

FIG. 4C represents an alternative embodiment of the reversing pitch azimuth angle compensation device 210 shown in FIGS. 4A and 4B. This embodiment, designated by reference numeral 210', is depicted in the fully compressed position in the manner of device 210 of FIG. 4B. Conceptually and functionally, device 210' is essentially identical to device 210. The only material difference is that the link members 122 and joint means 124 are replaced by second class linkages 122' which are constructed similarly to the flexures 24, 26, 28, 56, 58 and 60 described above in connection with the conventional remote center compliance system 10 of FIG. 1. It will be understood, however, that linkages 122' operate as do link members 122 and joint means 124 to afford the desired azimuth motion and not as flexures 24, 26, 28, 56, 58 and 60 which resist such motion.

Figure 5:
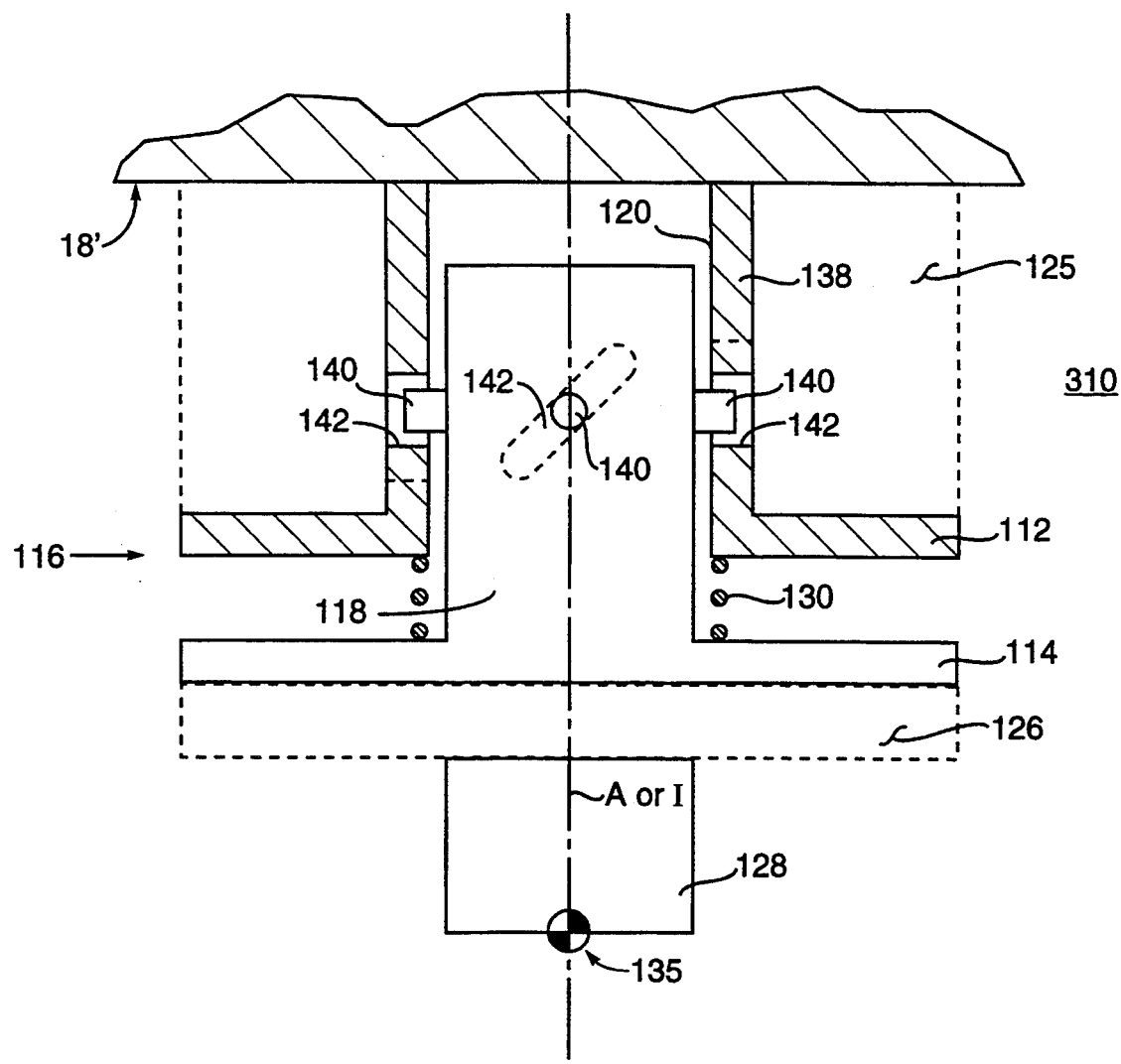
FIG. 5 is a schematic cross-sectional diagram, in elevation, of a further preferred embodiment of an azimuth angle compensation apparatus constructed according to the present invention shown in conjunction with an assembler device.

Another preferred embodiment of the azimuth compensation device of the instant invention identified generally by reference numeral 310, is shown in FIG. 5. Although manifestly constructed differently, device 310 (which device may be referred to a fixed pitch azimuth compensator) includes many features either similar to or in common with the embodiment of the invention represented in FIGS. 3A–3D. In this connection, FIG. 5 shows a mechanical device comprised of a first member (upper plate) 112 and second member (lower plate) 114. According to the mode of operation of device 310 described below, the shape of the plates 112, 114 is of no practical significance and may assume any conventional geometric configuration including circular, elliptical or polygonal. Plates 112, 114 are coaxial with a central circular shaft 118 and a circular tube 138 concentrically and closely surrounding shaft 118. Plate 112 is fixed to the tube 138 and plate 114 to the shaft 118 which is translatably and rotatably moveable within tube 138. The plates 112, 114 are constrained to be parallel at all times by an elongated bearing means 120 which is that portion of tube 138 in contact with the central shaft 118. Device 310 includes connection means 116 that connect the plates 112 and 114 and permit an operator member 128 to twist about its insertion axis I when the operator member is brought into contact with a workpiece (not illustrated) within which it is to be inserted. That is to say, connection means 116 function essentially as do their above-described counterparts.

In this embodiment, however, the connection means 116 includes guidance means comprising at least one and, preferably, a plurality of bosses 140 provided on the exterior of the central shaft 118 which engage helical slots 142 in the central tube 138. The pitch arising from the motion of the bosses 140 travelling within slots 142 is equal to the axial motion divided by the corresponding angular or azimuth motion, and given by the tangent of the helix angle. It will be appreciated that, alternatively, the connection means may equivalently be constructed as radially inwardly directed bosses provided on the interior of the tube 138 which would engage helical slots formed in shaft 118. In either case, the helical slots should closely fit the bosses to prevent backlash, or play, between the shaft 118 and tube 138 as backlash inherently adds uncertainty to the relative positions of the parts to be assembled. One may, of course, construct a helical slot with a variable pitch, but this is considered generally impractical in light of the difficulty and costs of doing so as was analogously demonstrated by the notion of uniformly varying the lengths of the link members 122 of the azimuth compensation device 110 of FIGS. 3A–3D.

Like all embodiments thus far described, the connection means 116 of the device 310 also includes a biasing means 130, e.g., a compression spring, which serves to keep the plates apart as well as provide the necessary reaction force to exert the azimuth compensating motion about the insertion axis I when the operator member is brought into contact with the workpiece. The plates may be restrained from further motion by an unillustrated stop which may be provided on or which engages the end of the shaft, or by the limits of travel imposed by the helical slots 142 in the tube 138.

A significant advantage of the fixed pitch compensation device 310 is that it may be built more compactly and with fewer parts than, for example, devices 110 and 210 discussed hereinabove. Moreover, it should be considered when the force needed to twist the operator member with respect to the hole in which it is to be inserted is known by experiment and does not vary between applications. And, as with the other embodiments of the invention, the preload forces acting prior to the occurrence of azimuth compensation motions depends directly on the compression of the spring 130. Since the initial distance between the plates 112, 114 is fixed by the bosses 142 and slots 140, the effective preload will also be fixed unless the spring is independently adjusted with a locking collar (not shown).

Further, inasmuch as this device (like the others disclosed herein) compensates only for azimuth errors, it is recommended that it be used in conjunction with a conventional or adjustable center RCC 126 when elevation position and angle errors are anticipated in mechanized assembly tasks. An additional benefit of the device 310 is that its compact geometry can be easily manufactured to match the open center bore of conventional RCC devices.

Figure 6:
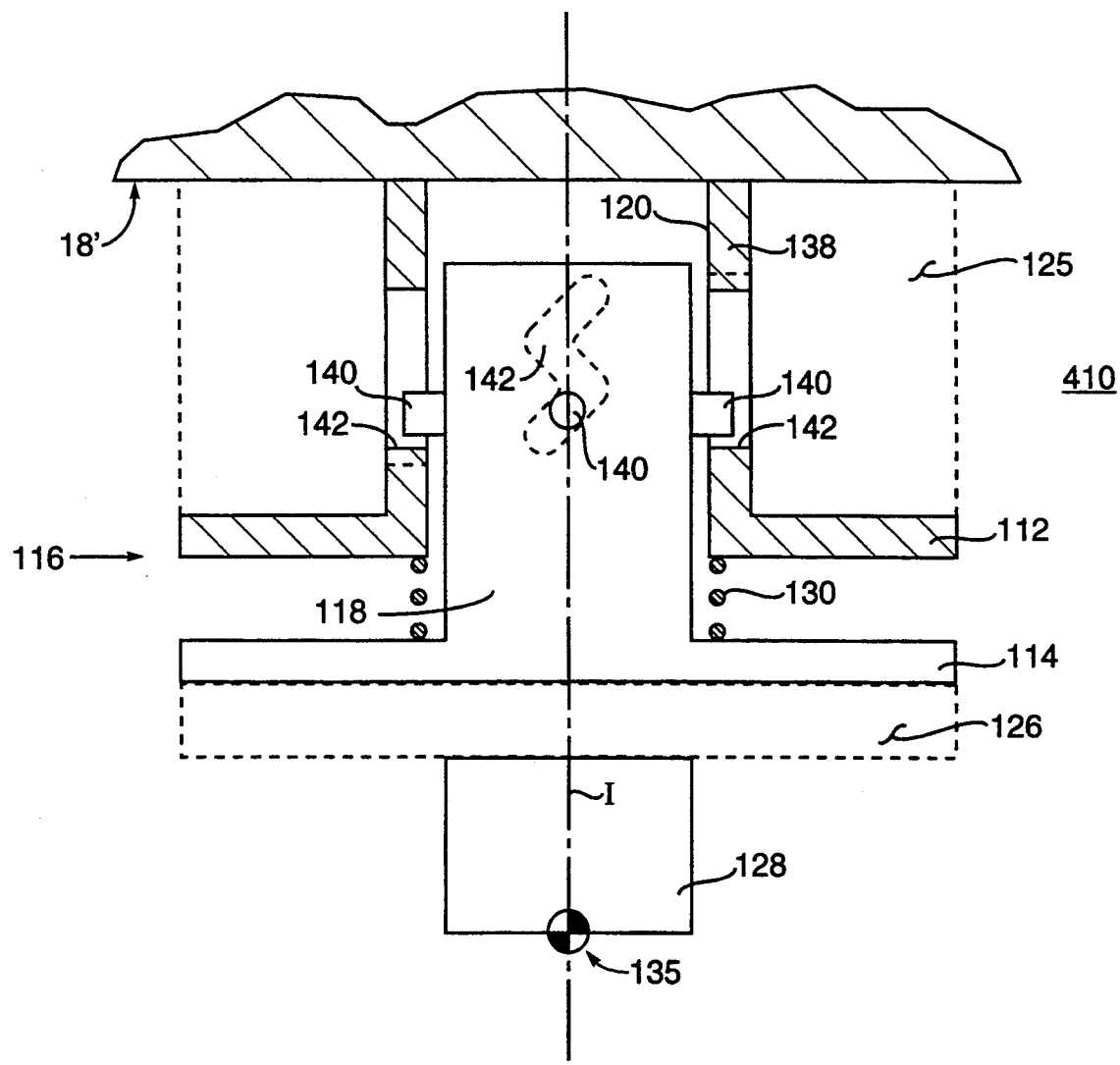
FIG. 6 is a schematic cross-sectional diagram, in elevation, of a further preferred embodiment of an azimuth angle compensation apparatus constructed according to the present invention shown in conjunction with an assembler device.

Another presently preferred embodiment of the instant invention is presented in FIG. 6 in which many of the features are identical to those of azimuth compensation device 310 set forth above. Hence, only those features which materially differ from device 310 will be described in detail. The azimuth compensation device 410 of FIG. 6, which may be appropriately referred to as a fixed pitch reversing azimuth compensator, incorporates the first and second members 112, 114 and connection means 116 in generally the same manner in which they were utilized in device 310. According to this particular embodiment, however, the motion of the central shaft 118 is constrained to follow a substantially sinusoidal or sigmoidal path by virtue of at least one and, preferably, a plurality of bosses 140' attached thereto which engage substantially sinusoidal or sigmoidal slots 142' provided in the central tube 138. Again, the positions of the bosses 140' and slots 142' may be reversed, if desired. The pitch of this substantially sinusoidal sigmoidal motion is equal to the axial motion divided by the corresponding angular (azimuth) motion, and is determined by the tangent of the slot angle at the point in question along the slot 142'.

A primary advantage of the fixed pitch reversing azimuth compensation device 410 is similar to that afforded by the variable pitch reversing azimuth compensator 210 of FIG. 4A and 4B. Namely, the sense of the rotation of the operator member 128 about the insertion axis I, and hence the initial orientation of the mating parts (object and workpiece) with respect to each other, need not be biased in advance. The distinctions of this approach over azimuth compensating device 210 is that device 410 may be built more compactly and with fewer parts, and, in the event that the initial sense of azimuth compensation is incorrect, the plate supporting the part to be inserted (i.e., lower plate 114) rotates in a first direction, then rotates back to its original position and continues from there in its initial direction at a possibly different rate. During this time, however, and similar to device 210, forces may arise between the parts being assembled. And, as noted previously, since there is ideally a strict relation between axial motion and azimuth angle, an additional passive compliance is needed in the x, y and/or z coordinates in the relevant insertion axis plane. For this purpose, as is shown, a conventional or adjustable center RCC 126 is recommended for use in conjunction with this embodiment.

Figure 7A:
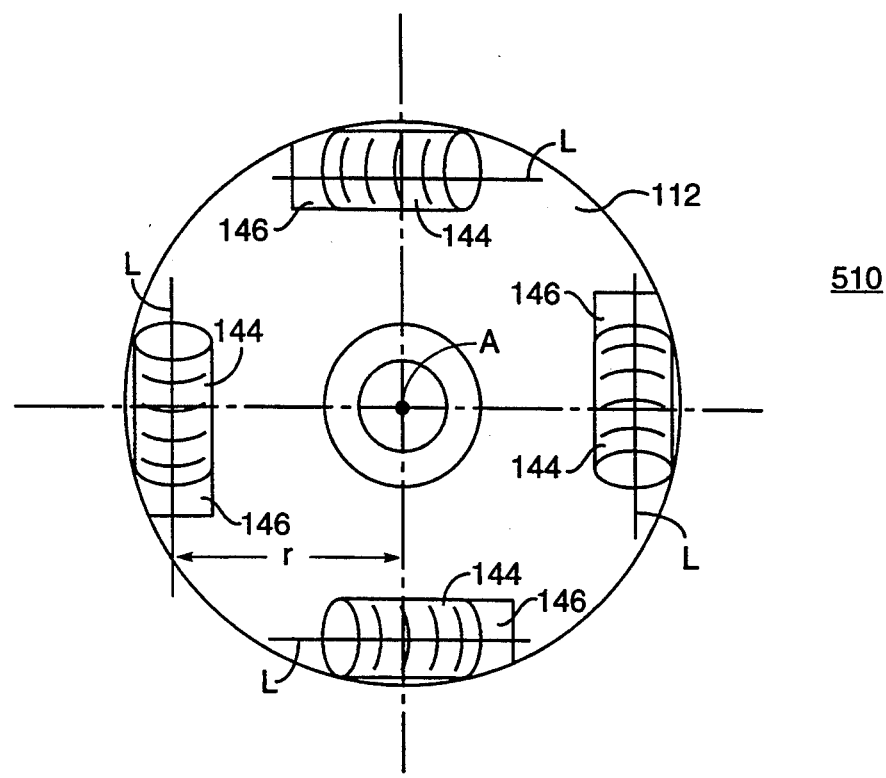
FIG. 7A is a view of the underside of a portion of a further preferred embodiment of an azimuth angle compensation apparatus constructed according to the present invention.
Figure 7B:
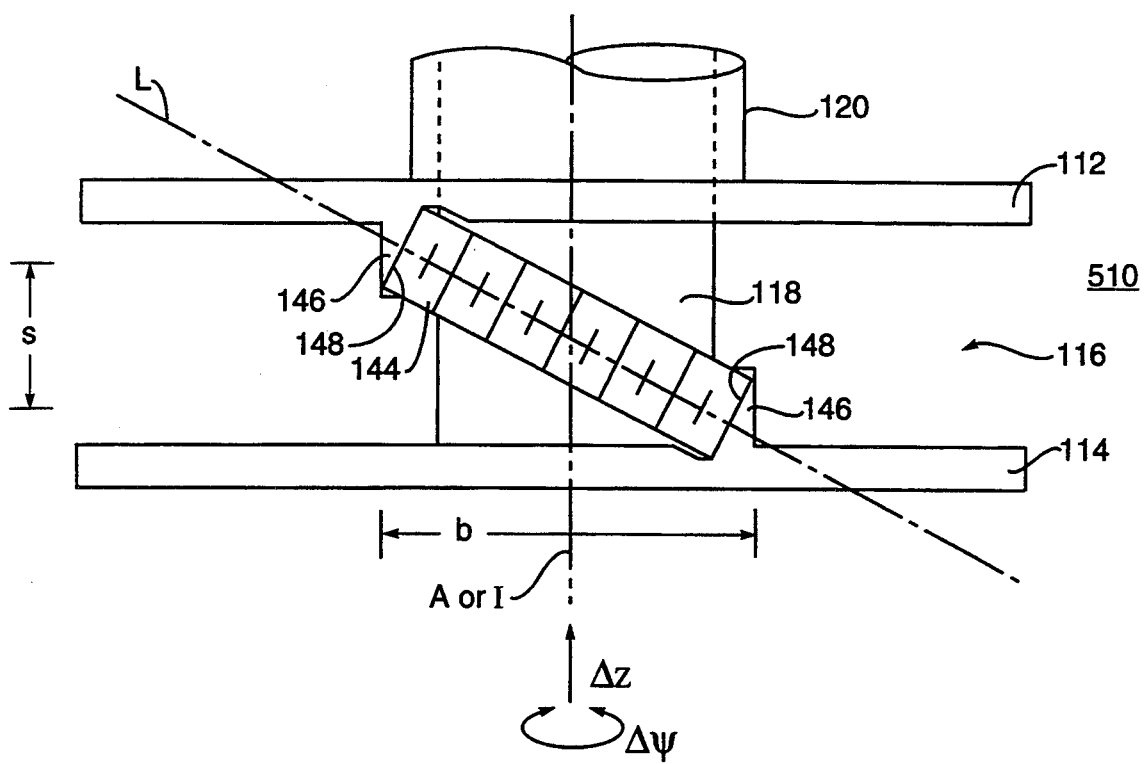
FIG. 7B is a side elevation view of the embodiment of the azimuth angle compensation apparatus shown in FIG. 7A in assembled condition (with certain components of the apparatus omitted for clarity of illustration)

FIGS. 7A and 7B reflect a further presently preferred embodiment of an azimuth compensation device in accordance with the instant invention. The device, identified by reference 510, may be denominated as a fixed pitch compliance linkage azimuth compensator. Device 510 includes a first member 112 and a second member 114 coaxial with a central shaft 118. The first member (or upper plate) 112 accommodates axial and rotational motion of the shaft. The second member (or lower plate) 114, on the other hand, is affixed to the shaft. The first and second members 112, 114 again are plates of any desired geometric configuration, although circular (as illustrated) is preferred for this embodiment to minimize bulk. And, once again, collar-like bearing means 120 are preferably provided to maintain the plates in parallel relation during operation of the device. The connection means 116 according to this embodiment include shear accommodating means. In a preferred arrangement, the shear accommodating means comprise at least one and, desirably, a plurality of shear springs 144 whose longitudinal axes L extend substantially normal to the central axis A of shaft 118 at distance r therefrom (FIG. 7A). Opposite ends of each shear spring 144 are attached to anchor members 146, which members also form part of the connection means 116.

Figure 7C:
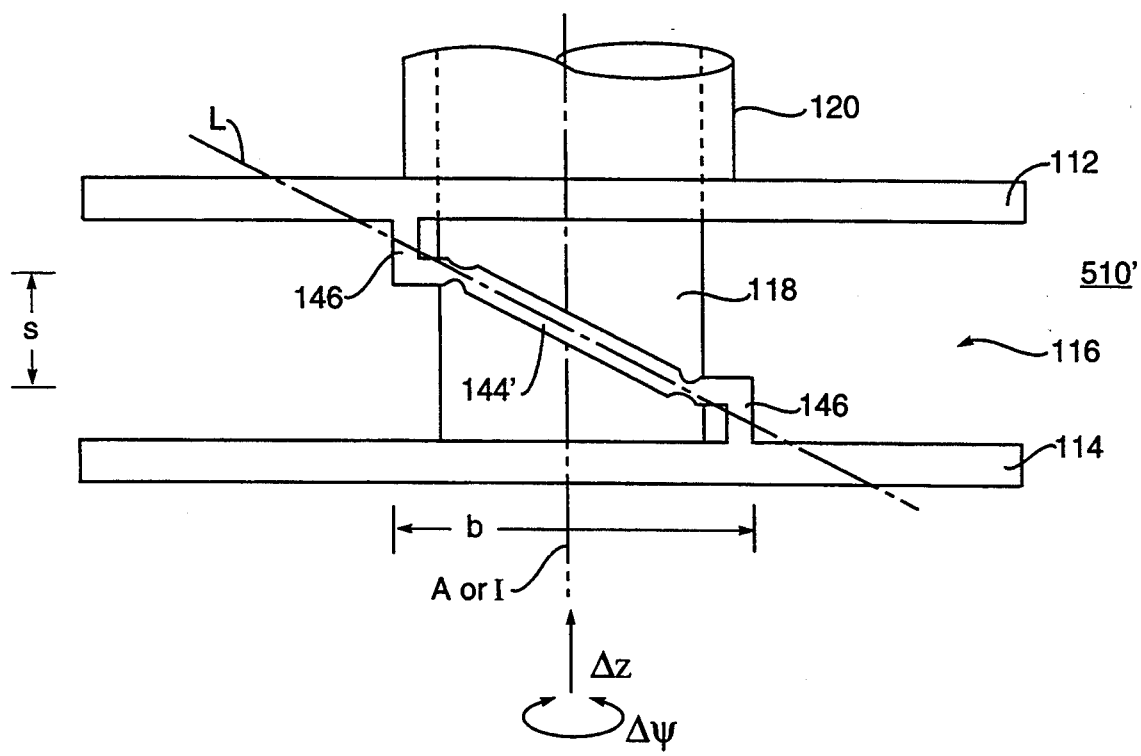
FIG. 7C is a view similar to FIG. 7B of an alternative embodiment of the azimuth angle compensation apparatus of FIG. 7A.
Figure 7D:
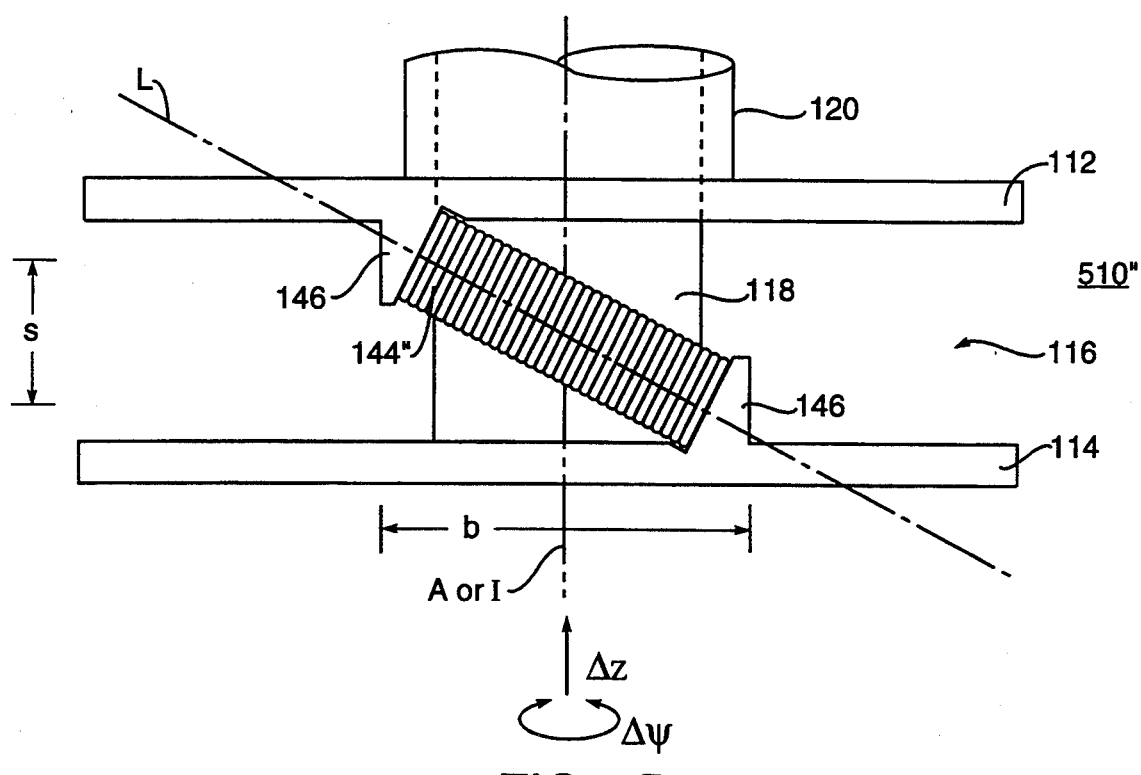
FIG. 7D is a view similar to FIGS. 7B and 7C of a further alternative embodiment of the azimuth angle compensation apparatus of FIG. 7A.

According to a preferred construction, the anchor members protrude downwardly from the upper plate 112 and upwardly from the lower plate 114 and include inclined faces 148 for maintaining the ends of the shear springs in substantially parallel relation during operation. Each shear spring 144 is inclined to the vertical and disposed about the central axis A in a manner similar to the link members 122 of device 110 of FIGS. 3A–3D, supra. A shear spring as herein employed constrains motion of the lower plate 114 to a substantially helical path by permitting compliant motion normal to the longitudinal spring axis L and by resisting motion along such axis. Such springs are well known in the art, and are manufactured, for example, by Lord Corporation of Erie, Pa. Coil-bound springs such as those used in the conventional RCC device disclosed in U.S. Pat. No. 4,848,757 function essentially as do shear springs 144 and may serve as an acceptable alternative thereto. Moreover, any suitable shear accommodating means (examples of which are depicted in FIGS. 7C and 7D) that effectively resists motion along its longitudinal axis L while permitting motion lateral thereto may be used in lieu of shear springs 144.

The pitch of the helical motion in this embodiment is determined by the mounting angle of the shear 144 springs relative to the two plates 112, 114. Similar to the initial configuration shown in FIG. 3D, a pre-selected starting configuration is shown in which the shear springs 144 are at about 63° from the vertical direction. A small motion which brings the plates together by an amount $\Delta z$, will cause the lower end of the spring to move to the right by about half that amount, since the ends of each shear spring remain substantially parallel. The resulting angular (azimuth) motion of plate 114 is thus approximately proportional to the vertical separation of the spring ends s divided by the horizontal distance or base length b between the spring ends. The pitch is then approximately r times b divided by s.

In contrast with the other embodiments described above, the shear springs 144 combine the functions of biasing the plates apart, providing predictable compliant forces, and guiding the motion of plate 114, i.e., establishing the pitch thereof. Preferably, the shear springs are restrained from overtravel by a stop (not shown) on the end of the shaft 118.

The virtue of a compliant linkage compensation device such as device 510 is that it may be built very compactly and with a few simple parts. It should be considered when the force needed to twist the part with respect to the hole within which it is to be inserted is known by experiment, and when the preload and rate of compliance are fixed and do not vary between applications.

Since device 510, like the others thus far described, compensates only for azimuth errors, it is recommended that it be used in conjunction with a conventional or adjustable center RCC when elevation position and angle errors are anticipated in mechanized assembly tasks. The compact geometry of this embodiment can be easily matched to fit the open center bore of conventional RCC devices. Combining the two devices results in a most compact assembly tool which responds to the needs of both planar (axisymmetric) and spatial (nonaxisymmetric) tasks.

FIGS. 7C and 7D represent alternative embodiments to the fixed pitch compliance linkage azimuth compensator device 510 and are designated respectively by reference numerals 510' and 510''. Conceptually and functionally, devices 510' and 510'' are essentially identical to device 510. Device 510' of FIG. 7C, however, substitutes coil bound springs 144' for shear springs 144. Likewise, device 510'' of FIG. 7D employs leaf springs 144'' for this purpose. In either case, coil bound springs 144' and leaf springs 144'', like shear springs 144, combine the functions of biasing the plates apart, providing predictable compliant forces and guiding the motion of plate 114 by establishing the pitch thereof.

Moreover, in all embodiments of the azimuth compensation device described herein which employ link members 122 and joint means 124, such link members and joint means may be replaced by suitable flexure means similar to the second class linkages 122' of FIG. 4C or the shear springs 144, coil bound springs 144' and leaf springs 144" of FIGS. 7A–7D to effect the desired plate compliant forces, pitch and plate separation force. In such case, the need for biasing means 130 would be eliminated.

Table 1 provides exemplary test capabilities of an azimuth compensation device constructed in accordance with device 110 of FIGS. 3A and 3B having an initial link member 122 inclination of about 63° from the vertical as in FIG. 3D. The device 110 is also used in conjunction with a conventional RCC device.

TABLE 1

| Peg & Hole Type | Peg Chamfer | Hole Chamfer | Hole to Peg Clearance | Position Errors: | | | | |
|---|---|---|---|---|---|---|---|---|
| | | | | x | y | θ | φ | ψ |
| 1" Square | .003" | .030" | .001" | .01" | .01" | 1° | 0° | 4° |
| 1" Square @ 45° | .003" | .030" | .001" | .01" | .01" | .7° | .7° | 4° |
| Rectangle 2" × 0.5" | .003" | .030" | .001" | .01" | .01" | 1° | 0° | 2° |
| 1" Hex across flats | .003" | .030" | .001" | .01" | .01" | 1° | 0° | 4° |
| Triangle 1" sides | .003" | .030" | .001" | .01" | .01" | 1° | 0° | 4° |
| Spline .75" × 16 teeth | .003" | .030" | .0005" | .01" | .01" | 1° | 0° | 4° |

Where:
x is the relative lateral misalignment of the insertion axis of the peg and the central axis of the hole in a first direction;
y is the relative lateral misalignment of the insertion axis of the peg and the central axis of the hole in a second direction perpendicular to the first direction;
θ is the relative angular misalignment of the insertion axis of the peg and the axis of the hole in a first plane containing both axes;
φ is the relative angular misalignment of the insertion axis of the peg and the axis of the hole in a second plane containing both axes and perpendicular to the first plane; and
ψ is the relative peg-to-hole azimuth angle misalignment.

Table 1 reveals that the device 110 successfully inserts pegs into mating holes having relative azimuth angle misalignments on the order of 2° to 4°. Such apparatus may, however, compensate for azimuthal misalignments of lesser or greater magnitude, e.g., up to 20°, should the initial link member 122 configuration approximate that shown in FIG. 3C where the link members 122 are inclined at an angle of approximately 26° from the vertical. In azimuth angle compensation devices constructed according to device 510 of FIGS. 7A and 7B which use shear accommodation means 144 (shear springs, shear pads, or the like) under an initial spring inclination of about 63° from the vertical, azimuth angle (ψ) misalignments of up to 4° will be effectively compensated. Greater azimuthal compensation will, of course, be available in instances where the slope of the shear springs is less sharply inclined to the vertical. Further, it will be understood that in all embodiments disclosed herein involving link members 122 or shear accommodation means 144, the link members 122 and/or shear accommodation means may be arranged such that they slope downwardly to the left rather than to the right to effect an oppositely directed initial azimuth compensation motion. Likewise, the slots 142 (FIGS. 5 and 6) may assume reversed orientations to effect reversed azimuth motion compensation.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A system for assembling products, said system comprising:
   an assembler device for inserting an object into a workpiece, said assembler device establishing a centerline corresponding substantially to an insertion axis of said object: and
   an azimuth angle compensation device operably connected to said assembler device and said object for causing rotation of said object about said centerline when said object is brought into contact with said workpiece by said assembler device.

2. The system of claim 1 wherein said azimuth angle compensation device comprises:
   a first member;
   a second member; and
   means connecting said first and second members for causing said second member and said object to rotate about said centerline through at least one angle and in at least one direction when said object is brought into contact with said workpiece by said assembler device.

3. The system of claim 2 wherein said means connecting said first and second members comprise:
   a shaft arranged substantially colinearly with said centerline and substantially coaxially with said first and second members, wherein said shaft is affixed to said second member and supported for axial and rotation motion within said first member; and
   means for biasing said first and second members into spaced apart relation and for exerting a reaction force operable to move said second member relative to said first member when said object is brought into contact with workpiece by said assembler device.

4. The system of claim 3 wherein said biasing means comprises a compression spring arranged concentrically with said shaft and having at least one end in abutting contact with at least one of said first and second members.

5. The system of claim 4 wherein said means connecting said first and second members comprise guidance means for urging said second member to execute a predetermined pitch relative to said first member under the influence of said reaction force.

6. The system of claim 5 wherein said guidance means comprise at least one link member having first and second ends, first joint means connecting said first end of said at least one link member to said first member for substantially universal relative rotation therewith, and second joint means connecting said second end of said at least one link member to said second member for substantially universal relative rotation therewith.

7. The system of claim 6 wherein said first joint means and said second joint means respectively connect said first and second ends of said at least one link member at a predetermined radial distance from a central axis of said shaft.

8. The system of claim 7 wherein said first member comprises a first polygonal plate having a plurality of corners and said second member comprises a second polygonal plate having a plurality of corners and configured substantially identically to said first plate, said first and second joint means respectively connecting first and second ends of said at least one link member proximate to a corner of said first plate and proximate to a corner of said second plate.

9. The system of claim 8 wherein said at least one link member extends at a predetermined slope between said first and second plates.

10. The system of claim 9 wherein said at least one link member comprises a plurality of parallel link members extending at said predetermined slope.

11. The system of claim 8 wherein said first plate includes projections situated proximate said corners thereof and extending toward said second plate and second plate includes projections situated proximate said corners thereof and extending toward said first plate, said first and second joint means respectively connecting said first end of said at least one link member to one of said projections of said first plate and said second end of said link member to one of said projections of said second plate situated proximate a next succeeding corner of said second plate.

12. The system of claim 11 wherein said at least one link member extends at a predetermined slope between said first and second plates.

13. The system of claim 12 wherein said at least one link member comprises a plurality of parallel link members extending at said predetermined slope.

14. The system of claim 5 further comprising a tube affixed to said first member concentrically about said shaft and wherein said guidance means comprise at least one boss carried by one of said shaft and said tube for engaging at least one slot provided in the other of said shaft and said tube.

15. The system of claim 14 wherein said at least one slot describes a substantially helical path.

16. The system of claim 14 wherein said at least one slot describes a substantially sigmoidal path.

17. The system of claim 14 wherein said at least one boss comprises a plurality of bosses and said at least one slot comprises a plurality of slots.

18. The system of claim 3 wherein said biasing means comprise at least one shear accommodating means for resisting motion along a longitudinal axis thereof and for permitting motion lateral to said longitudinal axis, said at least one shear accommodating means being connected at a first end thereof to said first member and at a second end thereof to said second member.

19. The system of claim 18 wherein said at least one shear accommodating means comprise at least one shear spring.

20. The system of claim 18 wherein said first and second members include anchor members for maintaining said first and second ends of said at least one shear accommodating means in substantially parallel relation.

21. The system of claim 18 wherein said longitudinal axis of said at least one shear accommodating means extends substantially normal to a central axis of said shaft at a predetermined radial distance therefrom.

22. The system of claim 18 wherein said at least one shear accommodating means extends at a predetermined slope between said first and second members.

23. The system of claim 22 wherein said at least one shear accommodating means comprises a plurality of parallel shear accommodating means extending at said predetermined slope.

24. The system of claim 3 further comprising bearing means attached to said first member for maintaining said first and second members in parallel relation.

25. The system of claim 3 further comprising stop means attached to said shaft for limiting separation of said first and second members.

26. The system of claim 2 further comprising an operator member interconnecting said second member and said object.

27. The system of claim 1 wherein said assembler device includes a remote center compliance (RCC) device for establishing both said centerline and a remote center of compliance, said RCC device being operable to permit rotational motion about and translational motion with respect to said remote center of compliance in planes containing said centerline.

28. An azimuth compensation device for use with an assembler device for inserting an object into a workpiece, said assembler device establishing a centerline corresponding substantially to an insertion axis of said object, said azimuth compensation device comprising:
   a first member;
   a second member; and
   means connecting said first and second members for causing said second member and said object to rotate about said centerline through at least one angle and in at least one direction when said object is brought into contact with said workpiece by said assembler device.

29. The azimuth compensation device of claim 28 wherein said means connecting said first and second members comprise:
   a shaft arranged substantially colinearly with said centerline and substantially coaxially with said first and second members, wherein said shaft is affixed to said second member and supported for axial and rotational motion within said first member; and
   means for biasing said first and second members into spaced apart relation and for exerting a reaction force operable to move said second member relative to said first member when said object is brought into contact with workpiece by said assembler device.

30. The azimuth compensation device of claim 29 wherein said biasing means comprise a compression spring arranged concentrically with said shaft and having at least one end in abutting contact with at least one of said first and second members.

31. The azimuth compensation device of claim 30 wherein said means connecting said first and second members comprise guidance means for urging said second member to execute a predetermined pitch relative to said first member under the influence of said reaction force.

32. The azimuth compensation device of claim 31 wherein said guidance means comprise at least one link member having first and second ends, first joint means connecting said first end of said at least one link member to said first member for substantially universal relative rotation therewith, and second joint means connecting said second end of said at least one link member to said second member for substantially universal relative rotation therewith.

33. The azimuth compensation device of claim 32 wherein said first joint means and said second joint means respectively connect said first and second ends of said at least one link member at a predetermined radial distance from a central axis of said shaft.

34. The azimuth compensation device of claim 33 wherein said first member comprises a first polygonal plate having a plurality of corners and said second member comprises a second polygonal plate having a plurality of corners and configured substantially identically to said first plate, said first and second joint means respectively connecting said first and second ends of said at least one link member proximate to a corner of said first plate and proximate to a corner of said second plate.

35. The azimuth compensation device of claim 34 wherein said at least one link member extends at a predetermined slope between said first and second plates.

36. The azimuth compensation device of claim 35 wherein said at least one link member comprises a plurality of parallel link members extending at said predetermined slope.

37. The azimuth compensation device of claim 34 wherein said first plate includes projections situated proximate said corners thereof and extending toward said second plate and said second plate includes projections situated proximate said corners thereof and extending toward said first plate, said first and second joint means respectively connecting said first end of said at least one link member to one of said projections of said first plate and said second end of said link member to one of said projections of said second plate situated proximate a next succeeding corner of said second plate.

38. The azimuth compensation device of claim 37 wherein said at least one link member extends at a predetermined slope between said first and second plates.

39. The azimuth compensation device of claim 38 wherein said at least one link member comprises a plurality of parallel link members extending at said predetermined slope.

40. The azimuth compensation device of claim 31 further comprising a tube affixed to said first member concentrically about said shaft and wherein said guidance means comprise at least one boss carried by one of said shaft and said tube for engaging at least one slot provided in the other of said shaft and said tube.

41. The azimuth compensation device of claim 40 wherein said at least one slot describes a substantially helical path.

42. The azimuth compensation device of claim 40 wherein said at least one slot describes a substantially sigmoidal path.

43. The azimuth compensation device of claim 40 wherein said at least one boss comprises a plurality of bosses and said at least one slot comprises a plurality of slots.

44. The azimuth compensation device of claim 29 wherein said biasing means comprise at least one shear accommodating means for resisting motion along a longitudinal axis thereof and for permitting motion lateral to said longitudinal axis, said at least one shear accommodating means being connected at a first and thereof to said first member and at a second end thereof to said second member.

45. The azimuth compensation device of claim 44 wherein said at least one shear accommodating means comprise at least one shear spring.

46. The azimuth compensation device of claim 44 wherein said first and second members include anchor members for maintaining said first and second ends of said at least one shear accommodating means in substantially parallel relation.

47. The azimuth compensation device of claim 44 wherein said longitudinal axis of said at least one shear accommodating means extends substantially normal to a central axis of said shaft at a predetermined radial distance therefrom.

48. The azimuth compensation device of claim 44 wherein said at least one shear accommodating means extends at a predetermined slope between said first and second members.

49. The azimuth compensation device of claim 48 wherein said at least one shear accommodating means comprises a plurality of parallel shear accommodating means extending at said predetermined slope.

50. The azimuth compensation device of claim 29 further comprising bearing means attached to said first member for maintaining said first and second members in parallel relation.

51. The azimuth compensation device of claim 29 further comprising stop means attached to said shaft for limiting separation of said first and second members.

52. The azimuth compensation device of claim 29 further comprising an operator member interconnecting said second member and said object.

53. The azimuth compensation device of claim 29 wherein said assembler device includes a remote center of compliance (RCC) device for establishing both said centerline and a remote center of compliance, said RCC device being operable to permit rotational motion about and translational motion with respect to said remote center of compliance in planes containing said centerline.

* * * * *